No. 863,160.  
PATENTED AUG. 13, 1907.

G. F. DE WEIN.  
TANK CLOSURE.  
APPLICATION FILED JULY 6, 1905.

WITNESSES:

INVENTOR

UNITED STATES PATENT OFFICE.

GEORGE F. DE WEIN, OF MILWAUKEE, WISCONSIN, ASSIGNOR TO ALLIS-CHALMERS COMPANY, OF MILWAUKEE, WISCONSIN, A CORPORATION OF NEW JERSEY.

TANK-CLOSURE.

No. 863,160.　　　　Specification of Letters Patent.　　　　Patented Aug. 13, 1907.

Application filed July 6, 1905. Serial No. 268,479.

*To all whom it may concern:*

Be it known that GEORGE F. DE WEIN, a citizen of the United States, residing at Milwaukee, in the county of Milwaukee and State of Wisconsin, has invented certain new and useful Improvements in Tank-Closures, of which the following is a specification.

This invention relates to tank closures and has for its object the provision of means by which the head of the tank may be quickly and easily removed and replaced, the bolts clamping the head in place being swung back during removal of the head, but remaining in their relative circumferential position on the tank ready to be swung back into place when the head is replaced.

The invention also provides means for removing bolts individually without disturbing the other bolts.

Throughout the description, for convenience the tank is considered as being in a horizontal position.

Figure 1:
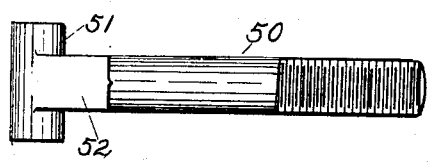
Figure 3:
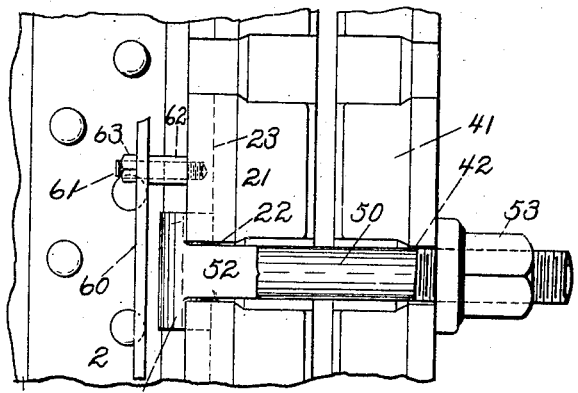
Figure 2:
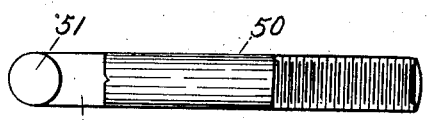
Figure 5:
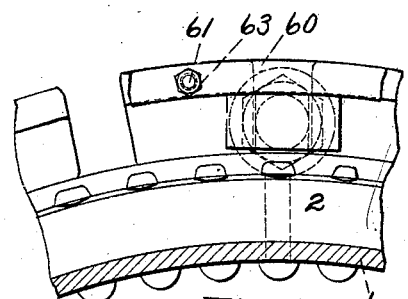
Figure 4:
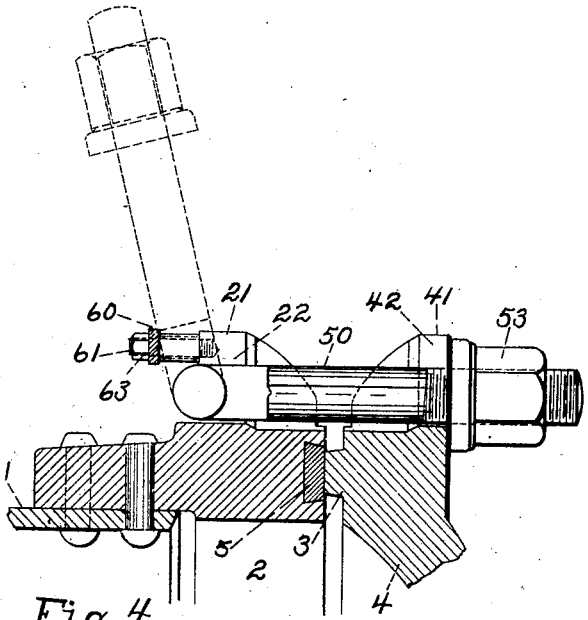

In the drawings,—Figure 1 is a plan view of a top clamping bolt. Fig. 2 is an elevation of the same. Fig. 3 is a plan view of a portion of the tank and head showing one of the clamping bolts in place. Fig. 4 is a vertical section of the same showing in dotted lines the bolt swung back into an inoperative position.
Fig. 5 is an end view of the same looking toward the right in Fig. 4 and the tank portion being shown in section.

A tank 1 is provided at an end with a strengthening annulus 2, riveted thereto. This annulus has embedded in its end face, coacting with an annular projection 3 on the tank head 4, packing material 5. The annulus 2 and the head 4 are provided with circumferential flanges 21, 41 respectively, these flanges being opposed to each other. The flanges are provided with transverse registering slots 22, 42. The flange 21 on the annulus 2 is provided upon its plane face towards the tank with an annular groove 23, see in dotted lines Fig. 3. This groove 23 is semi-circular in section.

A clamping bolt 50 is placed in each set of registering slots 22, 42. These bolts 50 are provided preferably with T heads 51, and each is provided with a shank portion 52 of square section. The T heads 51 are round in section and fit snugly into the grooves 23. The square portion 52 of the shank of each bolt 50 loosely fits the slot 22 and prevents rotation of the bolt on its axis when the same is not secured tightly in place. The bolt 50 is provided with a nut 53 which coacts with the flange 41 on the outer face of the head 4.

In order to prevent the bolts 50 from being removed from the closure when inoperative, a locking means must be provided. Such a means is shown in the drawings as a strip 60 attached to the flange 21, immediately outside of the groove 23. This strip 60 may be continuous, integral, or made up of arc sections, and is
spaced from the flange 21 by means of stud bolts 61 screwed into the flange 21 and having thereon collars 62 providing in their length the requisite spacing of the strips 60 from the flange 21. The strips 60 are then firmly held in place on the studs and against the collars 62 by nuts 63 screwed on to the studs 61 and against the strip 60. The strips 60 are spaced from the flange 21 by a distance less than the diameter of the T heads 51 of the bolts 50. This spacing, in coaction with the groove 23 in the flange 21, serves to lock the bolts 50 from radial disengagement from the closure.

In order to provide means for individually removing the bolts 50 without disturbing others, the strip 60 is so designed and located that it is just without the line of the bolts 50; that is, the inner circumference of the strips 60 is not less than the circumference of the circle externally tangent to the bolts 50 when in operative or bolted position. With such a structure the bolts 50 may be individually removed axially by first unscrewing their nuts 53.

In order to quickly remove the head 4 of the tank 1 and still retain the bolts 50 in their respective circumferential positions with respect to the tank 1, the nuts 53 are partially unscrewed and the bolts 50 swung about the T heads 51 as an axis, the heads retaining a bearing in the groove 23 until the bolts contact with the strips 60, where they remain in inoperative position. This description applies to the bolts on the upper half of the tank closure. Those on the lower half may hang in a vertical plane, resting by the T head 51 on the two edges provided by the strips 61 and one edge of the groove 23. The bolts cannot, however, be removed through the spaces between the strips 60 on the flange 21 because this space is narrower than the diameter of the T head 51. When it is desired to replace the head 4 on the tank, it is brought into position with the slots 41 registering with the slots 21. The bolts are then swung back into their respective sets of registering slots and the nuts 53 are tightened. If, for any reason, one or more of the bolts 50 are to be removed entirely from the closure, the nut 53 is entirely unscrewed and the bolt is shoved axially back through its sets of slots 21, 41, and so removed.

It is old in the art to provide a rigid stop directly in line with the bolts and make the T heads oval in section with the major axis transverse to the shank of the bolt; and to space the stop from the tank flange a distance slightly greater than the minor axis of the bolt head, countersinking the bolt head in a groove in the tank flange, as in the present invention. Such a means provides for the removal of the bolts laterally.
Such a stop also locks the bolts from radial removal from the closure in all but this one position. The present invention obviates the disadvantage of such a structure in that the bolt heads need not be oval in section. Also, it is cheaper and easier to support the locking strips from a plain flange surface rather than support the stop from the bottom of an annular groove semi-oval in section. Another advantage is that the bolts on the bottom of the closure where the tank is horizontal, will not drop out as soon as the nuts are loosened. In applicant's case there can be no dropping out nor any removal of the bolts radially from the closure. The only way the bolts may be removed is by removing the nuts and axially or longitudinally shoving them from their position in the slots of the flanges. It is also old in the art to apply separate springs bolted to the tank or annulus, to the individual bolt heads to prevent the bolts from being removed. Such a structure becomes more easily disarranged and is less positive in action than the present invention.

In accordance with the provisions of the patent statutes, the principle of operation of the invention has been described, together with the apparatus which is now considered to represent the best embodiment thereof; but it is desired to be understood that the apparatus shown is merely illustrative, and that the invention can be carried out by other means.

What is claimed is:

1. The combination with a tank provided with a flange adjacent an end thereof, of a head adapted to act as a closure for the end of said tank, said flange and said head being provided with slots, bolts provided with heads and shanks, the shanks of said bolts being adapted to be received within the slots of said flange and said head with their heads engaged against said flange, said tank being provided with means against which said bolts are adapted to engage to prevent the removal of said bolts from said slots by turning said bolts upon their heads as pivots while at the same time permitting removal of said bolts from said slots by moving them endwise therethrough.

2. The combination with an open-ended tank provided with a flange adjacent its open end, said flange being provided with slots, of a head for the end of said tank provided with slots adapted to register with the slots in said flange, bolts provided with heads and shanks adapted to be received within said slots with their heads resting against said flange and provided with means for clamping said head against said tank, said flange being constructed with a bolt-retaining part on said flange outside of said bolts to retain said bolts in said slots when swung outwardly against said part, said part being spaced from said tank so as to permit the removal of said bolts between said part and said tank by an endwise movement of said bolts.

3. The combination with an open-ended tank provided with a flange adjacent its open end, said flange being recessed and provided with transverse slots, of a head for the end of said tank provided with slots adapted to register with the slots in said flange, bolts provided with heads and shanks adapted to be received within said slots with their heads resting against said flange and in the recessed portion thereof, said bolts being provided with means for clamping said head against said tank, and a member secured to said flange outside of said bolts to retain said bolts in said slots when swung outwardly against said member, said member being spaced from said tank so as to permit the removal of said bolts between said member and said tank by an endwise movement of said bolts.

In testimony whereof I affix my signature in presence of two witnesses.

GEORGE F. DE WEIN.

Witnesses:
JOHN DAY, Jr.,
R. M. STONE.